United States Patent [19]

Tokunaga et al.

[11] Patent Number: 4,610,506

[45] Date of Patent: Sep. 9, 1986

[54] SINGLE POLARIZATION OPTICAL FIBERS

[75] Inventors: Toshihide Tokunaga, Kitaibaraki; Masaaki Kato, Hitachi, both of Japan

[73] Assignee: Hitachi Cable, Ltd., Tokyo, Japan

[21] Appl. No.: 568,725

[22] Filed: Jan. 6, 1984

[30] Foreign Application Priority Data

Jan. 11, 1983 [JP] Japan ................................ 58-2388

[51] Int. Cl.$^4$ ................................................ G02B 6/22
[52] U.S. Cl. .................... 350/96.33; 350/96.30; 350/96.34
[58] Field of Search ............... 350/96.29, 96.30, 96.31, 350/96.33, 96.34

[56] References Cited

U.S. PATENT DOCUMENTS

| 4,264,347 | 4/1981 | Shintani et al. ............. | 65/3.11 |
| 4,274,854 | 6/1981 | Pleibel et al. .............. | 350/96.30 X |
| 4,360,371 | 11/1982 | Blankenship et al. ......... | 65/3.12 |
| 4,372,647 | 2/1983 | Okamoto et al. ............. | 350/96.33 |
| 4,415,230 | 11/1983 | Keck ........................ | 350/96.33 |
| 4,426,129 | 1/1984 | Matsumura et al. ........... | 350/96.33 |
| 4,447,127 | 5/1984 | Cohen et al. ............... | 350/96.33 |
| 4,493,530 | 1/1985 | Kajioka et al. ............. | 350/96.34 |
| 4,500,168 | 2/1985 | Kajioka et al. ............. | 350/96.34 |

FOREIGN PATENT DOCUMENTS

| 2930704 | 2/1981 | Fed. Rep. of Germany . |
| 56-24306 | 3/1981 | Japan . |
| 57-188426 | 11/1982 | Japan . |
| 58-55340 | 4/1983 | Japan . |
| 2104239 | 3/1983 | United Kingdom . |

Primary Examiner—William L. Sikes
Assistant Examiner—Frank González
Attorney, Agent, or Firm—A. Thomas S. Safford

[57] ABSTRACT

Since the single polarization optical fiber according to the present invention comprises a core which does not substantially contain a dopant such as Ge, P or the like as well as a transition metal such as Fe, Cu or the like, the fiber has favorable radiation resistance, besides there is no decrease in refractive index at the central portion of the core, when the fiber is fabricated in accordance with an inner CVD method. It is also possible to decrease a vapor deposition temperature in the inner, CVD method by causing trace amounts of $B_2O_3$ to be present in the core. Further since the cladding of the optical fiber is constituted of high-purity $SiO_2$ containing fluorine or a mixture of fluorine and $B_2O_3$, the total thickness of the cladding and the inner jacket can be reduced in the case where high-purity $SiO_2$ is utilized as the core so that the fabrication thereof can easily be effected. Since the optical fiber is constituted so as to satisfy the relationship $n_1 > n_3 > n_2$ (refractive index $n_1$ of the core, refractive index $n_2$ of the cladding, and refractive index $n_3$ of the inner jacket), the resulting optical fiber is not affected by variations in the core and in addition, connection of the optical fibers can easily be effected by increasing the core diameter thereof while such optical fiber maintains a stable single-mode operation wavelength band along the longitudinal direction thereof.

6 Claims, 12 Drawing Figures

SINGLE POLARIZATION OPTICAL FIBERS

BACKGROUND OF THE INVENTION

1. Field of the Invention

This invention relates to single polarization optical fibers, and particularly to low loss single polarization optical fibers having excellent radiation resistance as well as other improved properties, which fibers may easily be fabricated.

2. Description of the Prior Art

For single polarization optical fibers, various constructions have already been proposed, and the most widely used type has the construction of FIG. 1 which shows an optical fiber of a four-layered construction comprising a core 11, a cladding 12, inner jacket 13 and an outer jacket 14.

The core 11 is made of $SiO_2$ glass containing a dopant such as $GeO_2$, $P_2O_5$ or the like, the cladding 12 is made of high-purity $SiO_2$, the inner jacket 13 is made of $SiO_2$ glass containing $P_2O_5$ and $B_2O_3$, and the outer jacket 13 is composed of an industrial silica glass tube. In this case, the reason for adding the dopant such as $GeO_2$, $P_2O_5$ or the like to the core 11 is in that it results in an increase of refractive index of the core so that the difference between the refractive index of the core and the refractive index of the cladding is relatively large, whereby the critical angle (maximum angle of incidence) is increased.

Such single polarization optical fibers have very excellent characteristics, but there is a defect in radiation resistance to some extent.

Namely, a dopant such as Ge, P or the like contained in the core is remarkably affected by radiation so that an increase in transmission loss may occur when the single polarization optical fibers are exposed to radiation, for example, in the vicinity of a nuclear reactor.

As a method for fabricating single polarization optical fibers, a soot deposition method similar to the VAD method or inner CVD (Chemical Vapor Deposition) method (or MCVD method, i.e., Modified Chemical Vapor Deposition method) is well known. In optical fibers fabricated in accordance with the inner CVD method, a dopant such as $GeO_2$, $P_2O_5$ or the like contained in the core may vaporize during heating to cause a decrease in the refractive index at the central portion of the core, so that such single polarization optical fiber provides a refractive index distribution as shown in FIG. 2. Otherwise, impurities contained in its outer jacket may be fused during heating to become united in the core so that satisfactory characteristics would not necessarily be obtained.

According to the results of our studies and experiments, it has been discovered that the core is desirably made from either high-purity $SiO_2$ or high-purity $SiO_2$ containing trace amounts of $B_2O_3$ in order to improve radiation resistance.

However, when such materials as mentioned above are utilized for a core, not only does the difference in refractive index between the core and its outer jacket become small or nonexistent, but also the difference between the refractive index of the cladding and the refractive index of core is reduced and the difference between the refractive index of the inner jacket and the refractive index of the core is reduced. As a result, the transmission band may become narrower. In order to improve this deficiency, the total thickness of the cladding and the inner jacket may be increased. However, if the total thickness of the cladding and the inner jacket is increased, the outer diameter of the resulting optical fiber may become larger than that of a conventional optical fiber that the utility thereof decreases.

In the case where the core of an optical fiber is constituted of high-purity $SiO_2$ or high-purity $SiO_2$ containing trace amounts of $B_2O_3$, it is desirable to make the critical angle (maximum angle of incidence) large. For this reason, it is necessary for the cladding to select a material having a lower refractive index than that of $SiO_2$ for constituting the optical fiber, so that such requirement is a significant problem in actuality.

Namely, it is convenient that the outermost layer of an optical fiber is made of high-purity $SiO_2$ in view of the fabrication thereof. Hence, if such fact is applied to a single polarization optical fiber, a refractive index distribution as indicated in FIG. 9 is obtained.

As a matter of course, it is not required that the outermost layer of high-purity silica is as pure as the core, but since the outermost layer does not contain significant amounts of dopants, the refractive index thereof becomes substantially equal to that of the core. In such an optical fiber, some of the energy of a wave traveling in the core may be transferred to the outermost layer. Thus, a spacing $\delta T$ between the core and the outer jacket (support tube) must be widened in order to reduce attenuation due to leakage. Specifically speaking, when the normalized frequency ($= n_o k_o T 2\Delta$, wherein $n_o$: refractive index of core, $\lambda$: applied wavelength, T: radius of core, and $\Delta$: difference in refractive indices of core and inner jacket) is 2.2, it is required to satisfy such condition that $\delta > 6$ in the minor axis of the inner jacket. Owing to the above reason, for the sake of fabrication of a low loss single polarization optical fiber having a high ellipticity, it is necesary to increase the difference in the refractive indices $\Delta$ of the core and the inner jacket, while decreasing the diameter of the core. On the other hand, however, the transmission loss as well as the single operation wavelength band are remarkably influenced by variation in the core diameter in such construction as described above so that it is difficult to fabricate single polarization optical fibers having a stable single mode operation wavelength band in the longitudinal direction thereof. A band in which an optical fiber can be operated in single mode by decreasing leakage may be expressed by approximately $2.0 < v < 2.3$ in accordance with normalized frequency v, if the variation in the diameter of the optical fiber along the longitudinal direction thereof is taken into consideration. Accordingly, there is such a problem that the applicable wavelength band of the type of optical fiber as described above is limited to a narrow range. Furthermore, in the case where, for example, the difference in the refractive indices $\Delta$ of the core and the inner jacket is 0.4% and the wavelength is 0.85 $\mu$m, the core diameter must be 4.98 $\mu$m even at the maximum, and where the wavelength is 0.63 $\mu$m, the core diameter is limited to 3.71 $\mu$m at the maximum.

In such construction as described above of the optical fiber, there have been such problems that it is difficult to fabricate low loss single polarization optical fibers being homogeneous along the longitudinal direction thereof, because loss is significantly influenced by variation in the core diameter of the optical fiber. Moreover, it is also difficult to connect such optical fibers to one another, or the optical fibers with a light source, because the core diameter of such optical fibers is too small.

SUMMARY OF THE INVENTION

It is the first object of the present invention to provide single polarization optical fibers which can be fabricated in accordance with an inner CVD method, do not have a decrease in the refractive index at the central portion of the core, and have excellent radiation resistance as well as other satisfactory characteristics.

The second object of the present invention is to provide single polarization optical fibers in which fusion of impurities contained in the outer jacket into the core can be prevented by heating the materials at a low inner deposition temperature in case of fabrication thereof in accordance with the inner CVD method.

The third object of the present invention is to provide single polarization optical fibers in which the total thickness of the cladding and the inner jacket can be reduced even in the case where high-purity $SiO_2$ is used as the core, besides which can be easily fabricated.

The fourth object of the present invention is to provide single polarization optical fibers which are not significantly affected by variation in the core diameter, and in addition which can easily be connected to one another or with a light source by increasing the core diameter without the single mode operation wavelength band becoming unstable along the longitudinal direction thereof.

According to the present invention, there is provided a single polarization optical fiber composed of a core having a circular section, a cladding disposed on the circumference of the core, an inner jacket disposed on the circumference of the cladding, and an outer jacket disposed on the circumference of the inner jacket wherein the aforesaid core is made of high-purity $SiO_2$ which does not substantially contain dopants such as Ge, P and the like as well as transition metals such as Fe, Cu and the like, and the following relationship:

$$n_1 > n_3 > n_2$$

is given among refractive index $n_1$ of the core, refractive index $n_2$ of the cladding, and refractive index $n_3$ of the inner jacket.

DETAILED DESCRIPTION OF THE INVENTION

Figure 1:
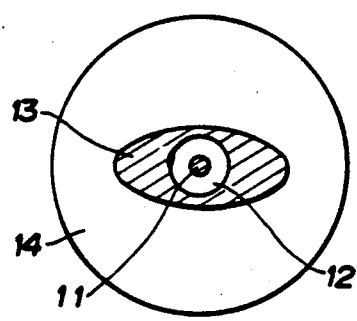
FIG. 1 is a sectional view showing a conventional single polarization optical fiber.
Figure 3:
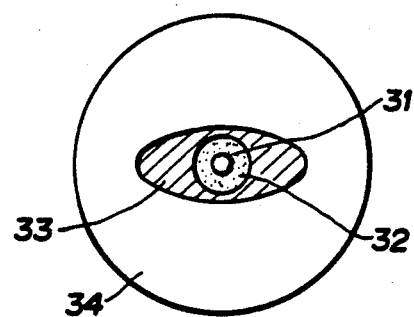
FIG. 3 is a sectional view showing an embodiment of the single polarization optical fiber according to the present invention.
Figure 2:
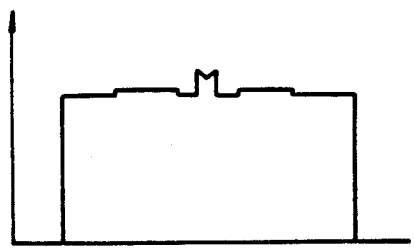
FIG. 2 is a graph showing a refractive index distribution of the conventional single polarization optical fiber of FIG. 1.

The construction of the first embodiment according to the present invention will specifically be described by referring to FIG. 3 wherein reference numeral 31 designates a core, 32 a cladding, 33 an inner jacket, and 34 an outer jacket, respectively.

The core 31 is made of high-purity $SiO_2$ and which does not contain any particular dopant. The cladding 32 contains $SiO_2$ as the principal constituent, fluorine, and either trace amounts of $B_2O_3$ or no $B_2O_3$. The inner jacket 33 contains $SiO_2$ as the principal constituent as well as $P_2O_5$ and $B_2O_3$. The outer jacket 34 contains $SiO_2$ as the principal constituent and which does not contain any particular dopant. It is to be noted herein that the term "high-purity $SiO_2$" means the $SiO_2$ does not substantially contain transition metals such as Fe or the like, which may adversely affect the transmission characteristics of the optical fiber. But "high-purity $SiO_2$" may contain a slight amount of the other impurities.

Fluorine contained in the cladding 2 is a dopant for controlling refractive index, and fluorine is a material which can significantly reduce the refractive index of the cladding with a smaller amount than that of $B_2O_3$.

Namely, even $SiO_2$ glass containing 14–15 mol% of $B_2O_3$ can only possess around 0.7% lower refractive index than that of $SiO_2$. A further decrease in refractive index cannot be attained, even if the $SiO_2$ glass contains 15 mol% or more of $B_2O_3$. Rather a further increase of $B_2O_3$ results in an increase in the refractive index.

However, fluorine can attain around 0.5% lower refractive index than that of the $SiO_2$ glass by including 1.5 mol% of the same. Furthermore, a content of 3 mol% of fluorine can attain around 1.0% lower refractive index than that of the $SiO_2$.

Figure 4:
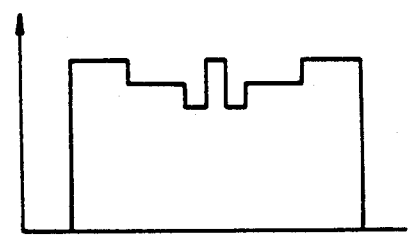
FIG. 4 is a graph showing a refractive index distribution of the single polarization optical fiber of FIG. 3.

Thus, the cladding 32 can be very easily formed as a layer having a low refractive index as indicated in FIG. 4.

Figure 5:
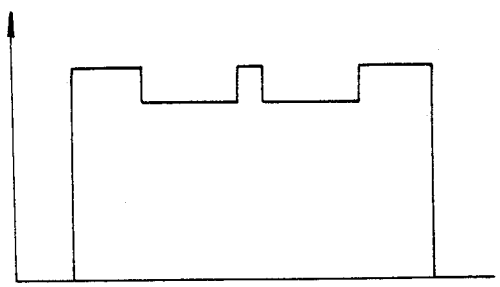
FIG. 5 is a graph showing a refractive index distribution of a single polarization optical fiber of a comparative example for comparing the same with the refractive index distribution of the optical fiber according to the present invention.

If a refractive index distribution has a shape as shown in FIG. 4, the cladding 32 and the inner jacket 33 can be formed with thinner thicknesses than those of the case where an optical fiber has a refractive index distribution having a shape as shown in FIG. 5, so that the optical fiber having the refractive index distribution of FIG. 4 can easily be fabricated. That is, if equivalent characteristics to those of the optical fiber having the refractive index distribution shown in FIG. 4 are intended in the optical fiber having the refractive index distribution of FIG. 5, the total thickness of the cladding 32 being a low refractive index portion and the inner jacket 33 must be increased. In this case, it is troublesome to fabricate an optical fiber by utilizing such constitutional elements as described above in accordance with either the inner CVD method or the outer CVD method (or normal CVD method), after all. Besides, a prescribed elliptical shape must be formed so that manufacturing conditions of such optical fibers are considerably restricted.

It is sufficient that the amount of fluorine contained in the cladding 32 is such that the refractive index of the cladding 32 is clearly lower than that of the inner jacket 33, for example, it may be around 2-5 mol%. From the standpoint of fabrication, it is convenient to use $BF_3$ as a raw material, and it is preferable that an amount of $B_2O_3$ contained in the cladding 32 is a trace amount of zero.

The $B_2O_3$ contained in the inner jacket 33 is a dopant added for decreasing refractive index and permitting distortion during fabrication, while $P_2O_5$ is a dopant which is added for decreasing viscosity and increasing refractive index. Thus, the viscosity and refractive index of the inner jacket 33 are controlled by adjusting the ratio of loadings as well as the total amounts of $B_2O_3$ and $P_2O_5$. The total amount of $B_2O_3$ and $P_2O_5$ is required to be 5-20 mol%, and around 10-15 mol% is suitable.

Such range as mentioned above is principally restricted by viscosity. That is, when the total amount of $B_2O_3$ and $P_2O_5$ is 5 mol% or less, the viscosity becomes high so that it is considerably difficult to form the inner jacket 33 into the elliptical shape as shown in FIG. 3.

The inner jacket is important for providing the single polarization feature of the optical fiber and it is necessary to have a sufficient ellipticity, so that the total amount of $B_2O_3$ and $P_2O_5$ is required to be 5 mol%, and 10 mol% or more is preferable.

However, when the total amount of $B_2O_3$ and $P_2O_5$ exceeds 20 mol%, the inner CVD method is unsuitable for fabrication of the optical fiber, because the viscosity of the inner jacket is so low that another layer with a higher viscosity, e.g., the layer for the cladding, cannot be applied by vapor deposition. Also, it becomes difficult to control the refractive index, when the aforesaid total amount exceeds 20 mol%.

In addition, it is preferable that a ratio of $B_2O_3$ is within 1.0-2.0 times higher range than that of $P_2O_5$ in the inner jacket 33. Namely, if the ratio of $B_2O_3$ is less than 1.0, its refractive index cannot clearly be maintained at a lower level than those of the core 31 and the outer jacket 34, and accordingly it is required to keep this ratio at 1.0 or more.

If the ratio of $B_2O_3$ to $P_2O_5$ is relatively high, i.e., 2.0 or more, only a difference in coefficient of thermal expansion between the inner jacket 33 and the outer jacket 34 or the like increases, while viscosity does not so decrease so that such optical fiber cracks easily and it is not desirable.

As described above, in the single poralization optical fiber according to the present invention, each composition is determined so that that a relationship $n_1 > n_3 > n_2$ is established among refractive index $n_1$ of the core, refractive index $n_2$ of the cladding, and refractive index $n_3$ of the inner jacket.

Although a commercially available industrial silica glass tube may be utilized as the outer jacket 34, high-purity $SiO_2$ derived from synthetic quartz may, of course, be utilized.

The single polarization optical fibers according to the present invention can be fabricated in accordance with not only the inner CVD method including evacuating step, but also the rod-in-tube method obtained by combining the VAD method with the inner CVD method or the outer CVD method. The single polarization optical fibers thus obtained are, of course, covered with a prescribed resin composition to put them to practical use, and in this case either single layer or plural layers of the resin composition for the covering may be utilized.

The single polarization optical fibers according to the first embodiment of the present invention as described above have the following remarkable advantages:

(1) Since the core is made of high-purity $SiO_2$, the radiation resistance thereof is favorable.

(2) Since the core is made of high-purity $SiO_2$ containing no dopant, there is no decrease in refractive index at the central portion of the core, even if the optical fibers are fabricated in accordance with the inner CVD method their characteristics are stable.

(3) Since the core is made of high-purity $SiO_2$, the viscosity is high so that there is no deformation even in the step for forming the inner jacket into an ellipse.

(4) Since the cladding is constituted of $SiO_2$ as the principal constituent and fluorine or fluorine containing trace amounts of $B_2O_3$, the difference in the refractive indices of the cladding and the core increases so that it is possible to increase critical angle. In addition, substantially no absorption loss is observed in a long wavelength band so that practical use of the optical fibers is possible in a long wavelength band.

(5) Since the amounts of $B_2O_3$ and $P_2O_5$ contained in the inner jacket are suitably selected, the optical fibers can easily be fabricated in accordance with the inner CVD method, the outer CVD method, or any other method so that the reproducibility thereof is favorable.

(6) Since the optical fibers are constructed so that the cladding has a lower refractive index than the inner jacket, it is possible to reduce the total thickness of the cladding and the inner jacket, even if they have the same characteristics with those of other optical fibers so that the optical fibers of the present embodiment of the invention can easily be fabricated and the reproducibility thereof is favorable.

The second embodiment of the present invention will be described hereinbelow by referring to FIGS. 3-8. Each constitutional element of the optical fiber according to the second embodiment of the present invention has the same composition as that of the optical fiber according to the aforesaid first embodiment except that the optical fiber of the second embodiment comprises a circular or elliptical core 31 made of high-purity $SiO_2$ containing $B_2O_3$, so that the overlapped explanation will be omitted.

With respect to refractive index, the composition is determined in the optical fiber of the present embodiment so that the following relationship:

$$n_4 \geq n_1 > n_3 > n_2$$

applies among refractive index $n_1$ of the core, refractive index $n_2$ of the cladding, refractive index $n_3$ of the inner jacket, and refractive index $n_4$ of the outer jacket.

The specific construction of the second embodiment of the present invention will more specifically be described hereinbelow in connection with the examples thereof.

EXAMPLE 1

An optical fiber was composed, as shown in FIG. 3, of the core 31 made of high-purity $SiO_2$ containing 0.1 mol% of $B_2O_3$, the cladding 32 made of high-purity $SiO_2$ containing 3 mol% of fluorine, the inner jacket 33 made of high-purity $SiO_2$ containing 10 mol% of $B_2O_3$ and 8 mol% of P$_2$O$_5$, and the outer jacket made of quartz glass being not high-purity. The fabrication of the optical fiber was effected in accordance with the inner CVD method accompanied with evacuation.

In these circumstances, since the core 31 and the cladding 32 had high viscosities, respectively, their circular sections were maintained, while since the inner jacket had a low viscosity, the section of which became elliptical.

The resulting optical fiber had the refractive index distribution as shown in FIG. 4. This is because fluorine has such a property which can significantly decrease refractive index with a small amount thereof.

Since the inner jacket 33 contained totally as much as 18 mol% of B$_2$O$_3$ and P$_2$O$_5$, the viscosity thereof was low so that it easily formed an elliptical shape, but the refractive index thereof was an intermediate refractive index between the core 31 and the cladding 32.

When the refractive index of the cladding 32 adjacent to the core 31 is adjusted to be lower than that of the inner jacket 33 disposed on the circumference of the cladding 32, the total thickness of the cladding 32 and the inner jacket 33 may be constructed with a thin thickness so that such optical fiber can easily be fabricated.

Namely, in the case where the equivalent characteristics to those of the above case are intended to obtain with the refractive index distribution as shown in FIG. 5, the total thickness of the cladding and inner jacket must be increased and it is very difficult to fabricate such a thick elliptical layer.

EXAMPLE 2

Figure 6:
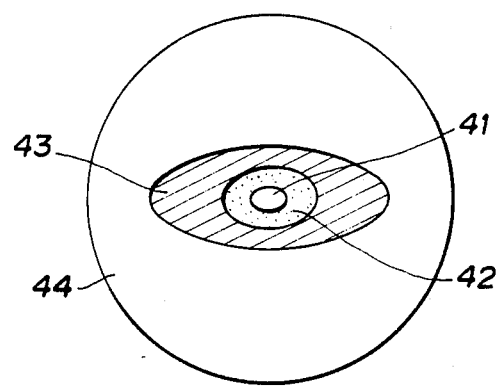
FIG. 6 is a sectional view showing another embodiment of the single polarization optical fiber according to the present invention.

An optical fiber was composed, as shown in FIG. 6, of a core 41 made of high-purity SiO$_2$ containing 4 mol% of B$_2$O$_3$, a cladding 42 made of high-purity SiO$_2$ containing 3 mol% of fluorine and 5 mol% of B$_2$O$_3$, an inner jacket 43 made of high-purity SiO$_2$ containing 10 mol% of B$_2$O$_3$ and 5 mol% of P$_2$O$_5$, and an outer jacket 44 made of quartz glass being not high-purity. The fabrication of the optical fiber was effected in accordance with a combination of the inner CVD method and the rod-in-tube method involving an evacuating step.

In these circumstances, since the inner jacket 43 had a low viscosity as in Example 1, an elliptical section was obtained in respect of the inner jacket 43, but each section of the core 41 and the cladding 42 became also somewhat elliptical.

Figure 7:
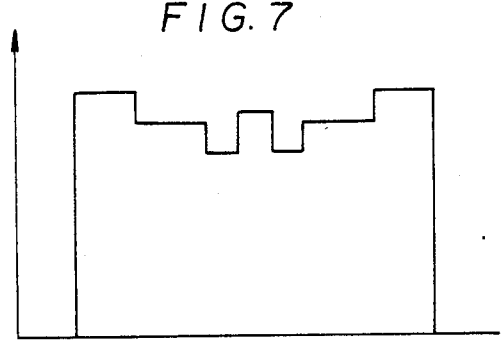
FIG. 7 is a graph showing a refractive index distribution of the single polarization optical fiber of FIG. 6.

The resulting optical fiber had the refractive index distribution as shown in FIG. 7.

Unlike Example 1, since the core 41 contains as much as 4 mol% of B$_2$O$_3$, the core 41 has a lower index than that of the outer jacket 44.

In Example 2, there was observed a slight increase in transmission loss as compared with the case of Example 1, but the single polarization characteristic of light is more excellent than that in Example 1, because the core 41 is also elliptical in addition to the elliptical inner jacket 43.

In the present invention, the reason why trace amounts of B$_2$O$_3$ are added to the core made of high-purity SiO$_2$ is to permit a lower heating temperature (temperature at inner vapor deposition) during inner vapor deposition. As a result of the lower inner vapor deposition temperature, there is no fear of fusion of impurities contained in the outer jacket (industrial silica glass tube) into the core at the time of heating.

The present invention is not limited to the aforesaid examples, but fluorine may be contained in the cladding to the extent where the refractive index of the cladding is clearly lower than that of the inner jacket, and around 2-5 mol% is suitable for practical use.

The B$_2$O$_3$ and the P$_2$O$_5$ contained in the inner jacket are added for permitting distortion, adjusting viscosity, and controlling refractive index as described above, and the loading ratio, the total amount and the like of B$_2$O$_3$ and P$_2$O$_5$ are similar to those described in the above first embodiment.

Figure 8:
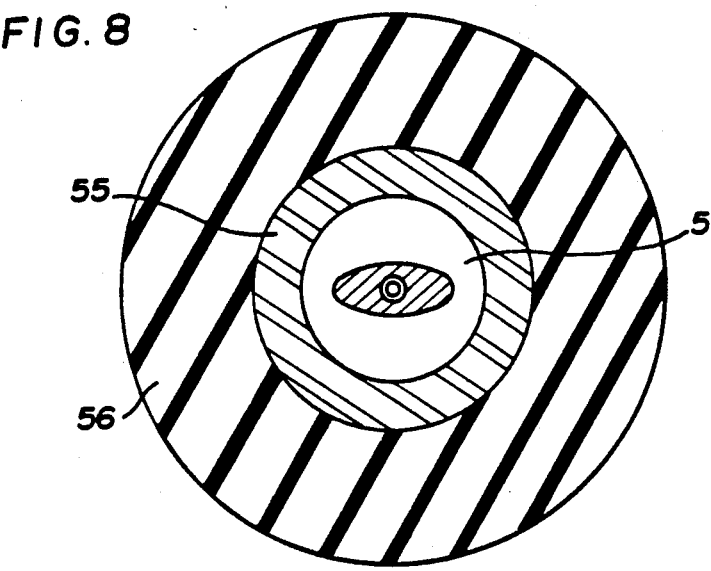
FIG. 8 is a sectional view showing an example of the single polarization optical fiber of the embodiment in FIG. 6 covered with nylon.
Figure 9:
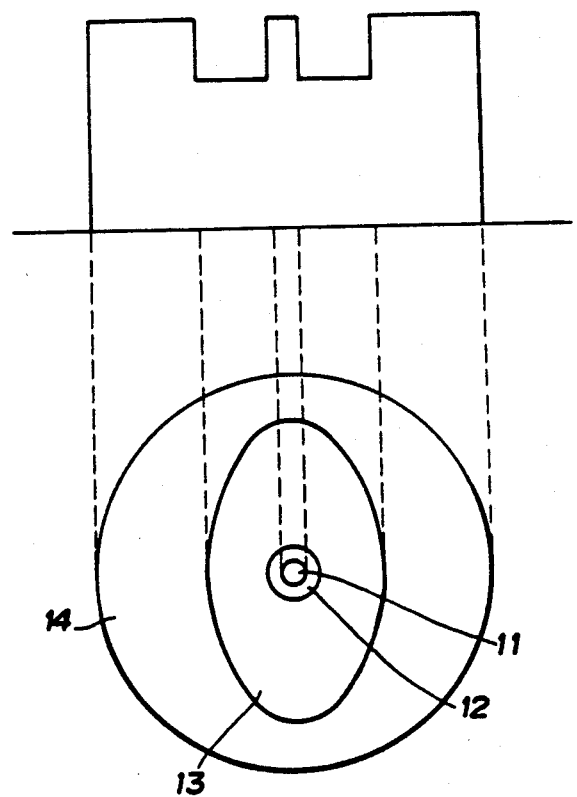
FIG. 9 is an explanatory view showing a section as well as a refractive index distribution of another conventional single polarization optical fiber.

FIG. 8 shows a construction wherein silicone resin 55 is applied on the circumference of the above described single polarization optical fiber 5, then, the resin applied is baked, and nylon 56 is further extruded to cover the circumference of the resulting optical fiber.

The single polarization optical fibers according to the second embodiment of the present invention as described above have the following remarkable advantages:

(1) Since the core is made of high-purity SiO$_2$ containing trace amounts of B$_2$O$_3$ and does not substantially contain P$_2$O$_5$ and GeO$_2$, the radiation resistance thereof is favorable, and at the same time the inner vapor deposition temperature can be reduced so that there is no fear of fusion of the impurities contained in the outer jacket into the core.

(2) Since the cladding is made of high-purity SiO$_2$ containing fluorine, such construction wherein the cladding has a higher viscosity than that of the inner jacket, while the cladding has a lower refractive index than that of the inner jacket can easily be obtained.

(3) Since the optical fibers are constructed so that the cladding has a lower refractive index than that of the inner jacket, it is possible to reduce the total thickness of the cladding and the inner jacket so that the optical fibers can easily be fabricated and the reproducibility thereof is also favorable.

(4) Since the amounts of B$_2$O$_3$ and P$_2$O$_5$ contained in the inner jacket are suitably selected, the fabrication, including maintenance of ellipticity in the inner jacket, of the optical fibers is easy so that there is no generation of cracks or the like, and the reliability and the reproducibility thereof are significant.

Next, the third embodiment of the present invention will be described hereinbelow by referring to FIGS. 10-12.

Figure 10:
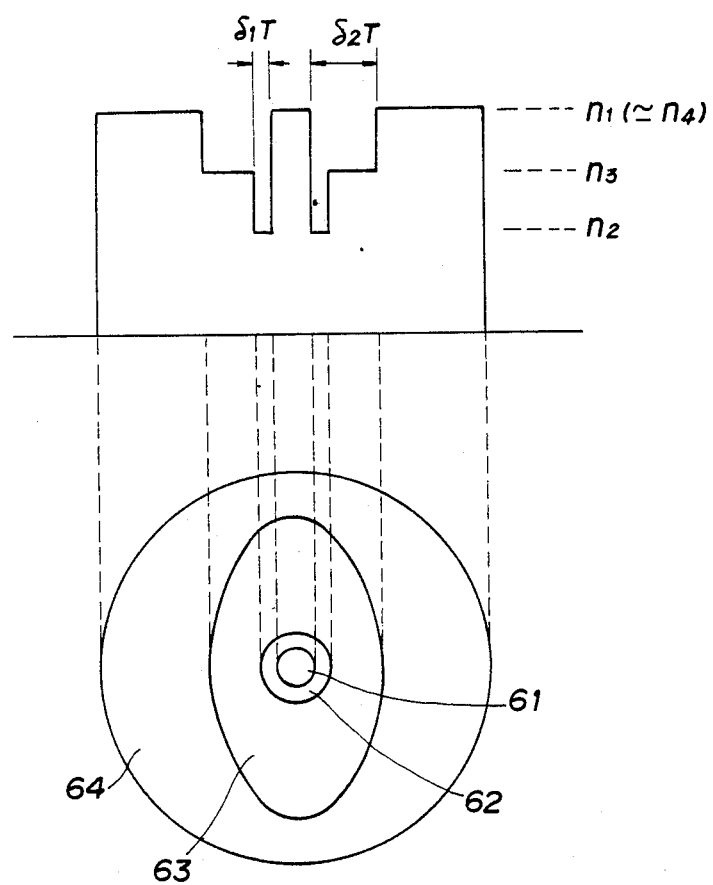
FIG. 10 is an explanatory view showing a section as well as a refractive index distribution of still another embodiment of the single polarization optical fiber according to the present invention.

In FIG. 10, reference numeral 61 designates a core, 62 a cladding, 63 an inner jacket, and 64 an outer jacket (support tube), respectively, and each composition of them is similar to that of the aforesaid first and second embodiments. The following relationship:

$$n_1 > n_4 > n_3 > n_2$$

$$(n_1 - n_2) \simeq 2(n_1 - n_3)$$

apply among refractive index $n_1$ of the core 61, refractive index $n_2$ of the cladding 62, refractive index $n_3$ of the inner jacket 63, and refractive index $n_4$ of the outer jacket 64.

Figure 11:
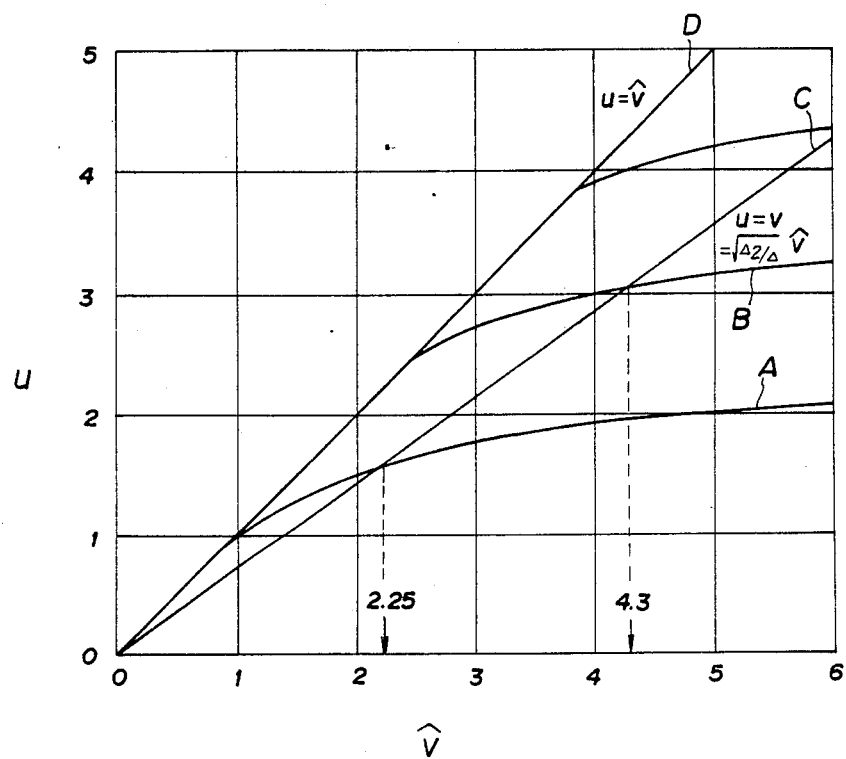
FIG. 11 is a graph showing a single mode operation band of the optical fiber in FIG. 10.

FIG. 11 is a graph showing a single mode operation band of the optical fiber in FIG. 10 wherein curve A indicates the basic mode and curve B indicates a mode of higher order, and an area enclosed with straight line C as well as the horizontal axis representing the normalized frequency $\hat{v}$ indicates the transmission band, an area enclosed with straight lines C and D indicates the leakage (loss) band (where mode leaks in the cladding occur), and an area enclosed with the curve B as well as the left-hand vertical axis representing the normalized transverse direction phase constant u indicates the non-transmission band, respectively. In this case single-mode transmission is realized in a transmission band wherein $\hat{v}$ is within a range of 2.25–4.3.

Figure 12:
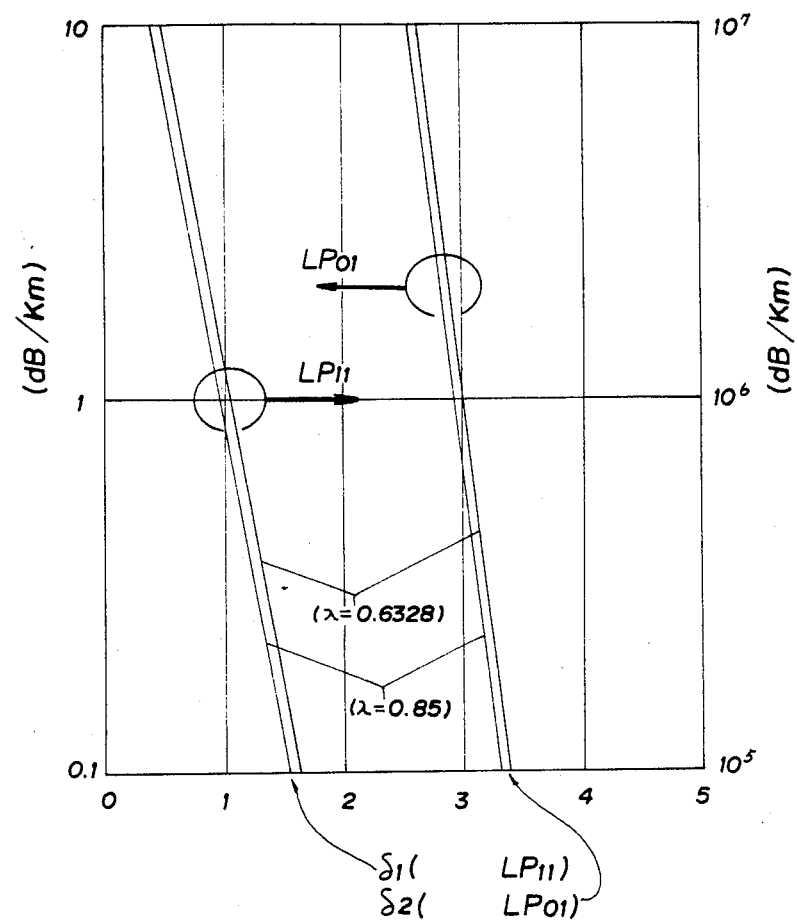
FIG. 12 is a graph showing each state of attenuation due to leakage in mode $LP_{11}$ and mode $LP_{01}$.

FIG. 12 is a graph showing each state of loss due to leakage in mode $LP_{11}$ and mode $LP_{01}$ wherein the $LP_{11}$ (mode of higher order) is determined by a value of $\delta_1$ and the loss thereof becomes substantially $10^6$ dB/km, while the $LP_{01}$ (basic mode) is determined by a value of $\delta_2$ and the loss thereof becomes substantially 1 dB/km.

In these circumstances, when the following relationship:

$$(\Delta_1/\Delta_2)=2$$

is established between the difference $\Delta_1$ in the refractive indices of core and cladding and the difference $\Delta_2$ in the refractive indices of the core and elliptical jacket, an operational range of single mode transmission is $2.25 < \hat{v} < 4.3$ as shown in FIG. 11, where $\hat{v}$ is normalized frequency defined by $\hat{v}=n_1 (2\pi/\lambda) T\sqrt{2\Delta_1}$, $\lambda$ is the frequency applied, and T is the core radius. In the case where operation point is set at $\hat{v}=3.5$ in consideration of easiness in fabrication of optical fibers, variation in diameter of the optical fibers and the like, if a thickness of the cladding is $\delta_1 T$, and a spacing between the core and the support tube, i.e., the total minimum thickness of the cladding and the elliptical jacket is $\delta_2 T$, each attenuation constant due to leakage of the mode $LP_{01}$ and the mode $LP_{11}$ is as shown in FIG. 12. Thus, ranges of $0 < \delta_1 < 1$ and $\delta_2 \geq 3.5$ are obtained as such a condition that the loss due to leakage of the mode $LP_{11}$ is $10^6$ dB/km or more and the loss due to leakage of the mode $LP_{01}$ is negligible. The fibers satisfying the aforementioned condition exhibit single mode characteristics, even if they are short lengths (several cm). If the $\delta_1$ is selected to be larger than 1, it is found that there is a case where continuous lengths (several hundreds m) are in single mode, while short lengths are in double mode. This is clear from a relationship between the $\delta_2$ and attenuation constant due to leakage of the mode $LP_{11}$ shown in FIG. 11. When the $\delta_2$ is selected to be less than 3.5, the mode $LP_{01}$ is subjected to attenuation due to leakage.

In FIG. 11, u designates the normalized transverse direction phase constant in the core.

About 1 km of a single polarization optical fiber of $\delta_1=0.9$, $\delta_2=5.6$, $\delta_1=0.33\%$, and $\Delta_2=0.15\%$ was fabricated by way of experiment. As a result, the silica core single polarization optical fibers of 4 dB/km total loss at a wavelength of 0.63 $\mu$m and 3 dB/km total loss at a wavelength of 0.85 $\mu$m were obtained.

When the $\delta_2$ is a value larger than 3.5, there is no problem from the standpoint of transmission, but so large a value is not realistic, if a relationship between the core diameter and the outer diameter of the optical fibers is taken into consideration, so that it is preferable that such value is within a range of $3.5 < \delta_2 < 6$.

More preferable is a range of $3.5 < \delta_2 < 4$.

Furthermore when such condition $(\Delta_1/\Delta_2) > 2$ is selected, there is a merit for broadening an operating range of $\hat{v}$, but this condition requires that a relatively large amount of a dopant be contained in the cladding for the reduction of the refractive index, if the fabrication therefor is taken into consideration, and as a result such condition is difficult to realize.

Hence, as a realizable value, $(\Delta_1/\Delta_2) \approx 2$ is determined.

The single polarization optical fibers according to the third embodiment of the present invention as described above have the following remarkable advantages:

(1) Since the core diameter may be increased in the optical fibers according to the present embodiment as compared with the construction of conventional optical fibers, there are no adverse affects upon either the transmission loss characteristics or the single-mode operation wavelength band due to a small core diameter.

(2) Since the optical fibers can favorably decrease leakage, the influence due to variation in diameter of the optical fiber along the longitudinal direction thereof is small so that any deterioration of the extinction ratio may be prevented.

(3) Since the wavelength band for single-mode operation is wide, the fabrication of the optical fibers is also easy.

(4) Since the core is made of high-purity $SiO_2$, the radiation resistance thereof is favorable.

The fourth embodiment of the present invention will specifically be described hereinbelow by referring to FIGS. 10–12.

Each constitutional element of the optical fiber according to the fourth embodiment of the present invention has the same composition as those of the optical fibers in accordance with the aforesaid first and second embodiments, so that the overlapped explanation will be omitted. The fourth embodiment differs from the third embodiment in that the following relationships:

$$n_1 \approx n_4 > n_3 > n_2$$

$$(n_1-n_2) \geq 2(n_1-n_3)$$

apply among refractive index $n_1$ of the core 61, refractive index $n_2$ of the cladding 62, refractive index $n_3$ of the inner jacket 63, and refractive index $n_4$ of the outer jacket 64.

In these circumstances, when the following relationship:

$$(\Delta_1/\Delta_2)=2$$

is established between the difference $\Delta_1$ in the refractive indices of the core and the cladding and the difference $\Delta_2$ in the refractive indices of the core and the inner jacket, an operational range of single mode transmission is $2.25 < \hat{v} < 4.3$ as shown in FIG. 11, where $\hat{v}$ is the normalized frequency defined by $\hat{v}=n_{co} (2\pi/\lambda) T\sqrt{2\Delta_1}$, $\lambda$ is the frequency applied, and T is the core radius. In the case where the operation point is set at $v=3.5$ in consideration of easiness in fabrication of optical fibers, variation in diameter of the optical fibers and the like, if a thickness of the cladding is $\delta_1 T$, and a spacing between the core and the outer jacket (support tube), i.e., the total minimum thickness of the cladding and the inner jacket is $\delta_2 T$, each attenuation constant due to leakage of the mode $LP_{01}$ and the mode $LP_{11}$ is as shown in FIG. 12. Thus, ranges of $\delta_1 \leq 1$ and $\delta_2 \geq 3.5$ are obtained as such a condition that the loss due to leakage of the mode $LP_{11}$ is $10^6$ dB/km or more and the loss due to leakage of the mode $LP_{01}$ is negligible. The fibers satisfying the aforementioned condition exhibit single mode characteristics, even if they are short lengths (several cm). If the $\delta_1$ is selected to be larger than 1, it is found that there is a case where continuous lengths (several hundreds m) are in single mode, while short lengths are in double mode. This is apparent from a relationship between the $\delta_2$ and attenuation constant due to leakage of the mode $LP_{11}$ shown in FIG. 11. When the $\delta_2$ is selected to be less than 3.5, the mode $LP_{01}$ is subjected to attenuation due to leakage.

In FIG. 11, u designates the normalized transverse direction phase constant in the core.

When the $\delta_2$ is a value larger than 3.5, there is no problem from the standpoint of transmission, but so large a value is not realistic, if a relationship between the core diameter and the outer diameter of the optical fibers is taken into consideration, so that it is preferable that this value is within a range of $3.5 \leq \delta_2 < 6$.

More preferable is a range of $3.5 \leq \delta_2 < 4$.

Furthermore when such condition $(\Delta_1/\Delta_2) > 2$ is selected, an operating range of $\hat{v}$ shifts to 2.5–4.7 and further to 3.0–5.5 so that a substantial wavelength band is remarkably broadened.

Accordingly, if wavelength is fixed to a value 0.85 μm or 0.63 μm which has usually been utilized, the core diameter of the optical fibers in the present embodiment may be larger than that of conventional ones.

For example, if the $\Delta_1$ and the $\Delta_2$ are selected to be 0.4% and 0.2%, respectively, the core diameter may be 8.91 μm in the case of a wavelength of 0.85 μm, and further the core diameter may be 6.63 μm in the case of a wavelength of 0.63 μm.

This means that the core diameter in the present embodiment can be increased about 2 times larger than that of conventional optical fibers, although the maximum refractive index differences are equal to each other in both cases, so that this is a very remarkable advantage from the viewpoint of the fabrication thereof.

The significant advantages of the single polarization optical fibers according to the fourth embodiment of the present invention as described above may be summarized as follows:

(1) Since the core diameter is as much as 6 μm or more, it is easy to connect either the optical fibers to one another, or the optical fibers with a light source.

(2) Since the optical fibers can favorably decrease leakage, the influence due to variation in diameter of the optical fiber along the longitudinal direction thereof is small so that any deterioration of the extinction ratio may be prevented.

(3) Since the wavelength band for single-mode operation is wide, the fabrication of the optical fibers is also easy.

(4) Since the core is made of high-purity $SiO_2$, the radiation resistance thereof is favorable.

We claim:

1. A single-polarization optical fiber, comprising:
    a substantially circular core consisting essentially of high-purity $SiO_2$ and at most about 5 mol% of $B_2O_3$, the core having a refractive index $n_1$;
    a cladding disposed on the circumference of the core, the cladding having a refractive index $n_2$;
    an inner jacket disposed on the circumference of the cladding, the inner jacket having a refractive index $n_3$; and
    an outer jacket disposed on the circumference of the inner jacket, the outer jacket having a refractive index $n_4$;
    wherein the refractive indexes satisfy the following relationship:

$$n_4 \geq n_1 > n_3 > n_2.$$

2. A single-polarization optical fiber as recited in claim 1, wherein the core consists essentially of high-purity $SiO_2$.

3. A single-polarization optical fiber as recited in claim 1, wherein the cladding consists essentially of high-purity $SiO_2$ and fluorine.

4. A single-polarization optical fiber as recited in claim 1, wherein the cladding consists essentially of high-purity $SiO_2$, fluorine, and $B_2O_3$.

5. A single-polarization optical fiber as recited in claim 1, wherein the refractive indexes satisfy the following relationship:

$$(n_1 - n_2) \geq 2(n_1 - n_3).$$

6. A single-polarization optical fiber as recited in claim 5, wherein the thickness of the cladding is less than or equal to the radius of the core, wherein the minimum total thickness of the cladding and the inner jacket is between about 3.5 and about 6 times the radius of the core, and wherein the diameter of the core is greater than or equal to about 6 micrometers.

* * * * *